(12) United States Patent
Matsubara et al.

(10) Patent No.: US 11,626,724 B2
(45) Date of Patent: Apr. 11, 2023

(54) LOAD CONTROL DEVICE TO BE CONNECTED TO POWER SUPPLY VIA CONNECTING MEMBER AND FUSE

(71) Applicant: DENSO ELECTRONICS CORPORATION, Anjo (JP)

(72) Inventors: Yukiko Matsubara, Anjo (JP); Kazunori Ozawa, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 0 days.

(21) Appl. No.: 17/472,757

(22) Filed: Sep. 13, 2021

(65) Prior Publication Data
US 2022/0094157 A1 Mar. 24, 2022

(30) Foreign Application Priority Data
Sep. 23, 2020 (JP) .............................. JP2020-158457

(51) Int. Cl.
*H02H 9/02* (2006.01)
*H02H 1/00* (2006.01)

(52) U.S. Cl.
CPC ............ *H02H 9/02* (2013.01); *H02H 1/0007* (2013.01)

(58) Field of Classification Search
CPC ...... B60R 16/03; G01R 15/146; G01R 15/18; G01R 15/20; G01R 19/16571; G01R 31/007; G01R 31/327; G01R 31/3277; H01H 2001/0005; H01H 2085/208; H01H 2300/052; H01H 85/30; H01H 85/46; H02H 1/0007; H02H 1/0061; H02H 3/006; H02H 3/042; H02H 3/08; H02H 3/0935; H02H 3/20; H02H 3/32; H02H 7/222; H02H 7/267; H02H 9/02; H03K 2217/0027; H03K 2217/0036
See application file for complete search history.

(56) References Cited

U.S. PATENT DOCUMENTS

| | | | |
|---|---|---|---|
| 10,281,528 B2 * | 5/2019 | Pizzuti | G01R 31/327 |
| 10,951,022 B2 * | 3/2021 | Lang | H01H 85/46 |
| 2002/0008951 A1 * | 1/2002 | Ohta | H02H 1/0015 361/93.9 |

(Continued)

FOREIGN PATENT DOCUMENTS

JP 2013-62976 A 4/2013

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

A load control device includes a power supply terminal connected to a power source via a fuse, a load driver configured to drive loads by electric power supplied from the power source via the fuse and the power supply terminal, a current detector configured to detect load currents that flow through the loads, respectively, and a controller. The controller is configured to calculate a total current that flows through the fuse based on the load currents detected by the current detector, calculate a physical quantity correlating with the total current and related to a connecting member that connects between the fuse and the power supply terminal in response to that the total current is equal to or higher than a predetermined current value, and limit at least one of the load currents in response to that the physical quantity is equal to or greater than a reference value.

3 Claims, 4 Drawing Sheets

(56) References Cited

U.S. PATENT DOCUMENTS

| | | | |
|---|---|---|---|
| 2003/0057774 A1* | 3/2003 | Kunugi | H02H 3/12 |
| | | | 307/10.1 |
| 2013/0063850 A1 | 3/2013 | Kawamoto et al. | |
| 2015/0295395 A1* | 10/2015 | Wortberg | H02H 3/093 |
| | | | 361/86 |
| 2019/0312427 A1* | 10/2019 | Lang | H01H 85/30 |
| 2020/0295541 A1* | 9/2020 | Dunham | H02B 1/04 |

\* cited by examiner

LOAD CONTROL DEVICE TO BE CONNECTED TO POWER SUPPLY VIA CONNECTING MEMBER AND FUSE

CROSS REFERENCE TO RELATED APPLICATION

The present application claims the benefit of priority from Japanese Patent Application No. 2020-158457 filed on Sep. 23, 2020. The entire disclosure of the above application is incorporated herein by reference.

TECHNICAL FIELD

The present disclosure relates to a load control device.

BACKGROUND

Conventionally, there has been known a load control circuit provided with a fuse that is connected between a power source and a power supply terminal of the load drive circuit so as to protect the load drive circuit and an external circuit connected to the power source.

SUMMARY

The present disclosure provides a load control device including a power supply terminal connected to a power source via a fuse, a load driver configured to drive multiple loads by electric power supplied from the power source via the fuse and the power supply terminal, a current detector configured to detect multiple load currents that flow through the multiple loads, respectively, and a controller. The controller is configured to calculate a total current that flows through the fuse based on the load currents detected by the current detector, calculate a physical quantity correlating with the total current and related to a connecting member that connects between the fuse and the power supply terminal in response to that the total current is equal to or higher than a predetermined current value, and limit at least one of the load currents in response to that the physical quantity is equal to or greater than a reference value.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
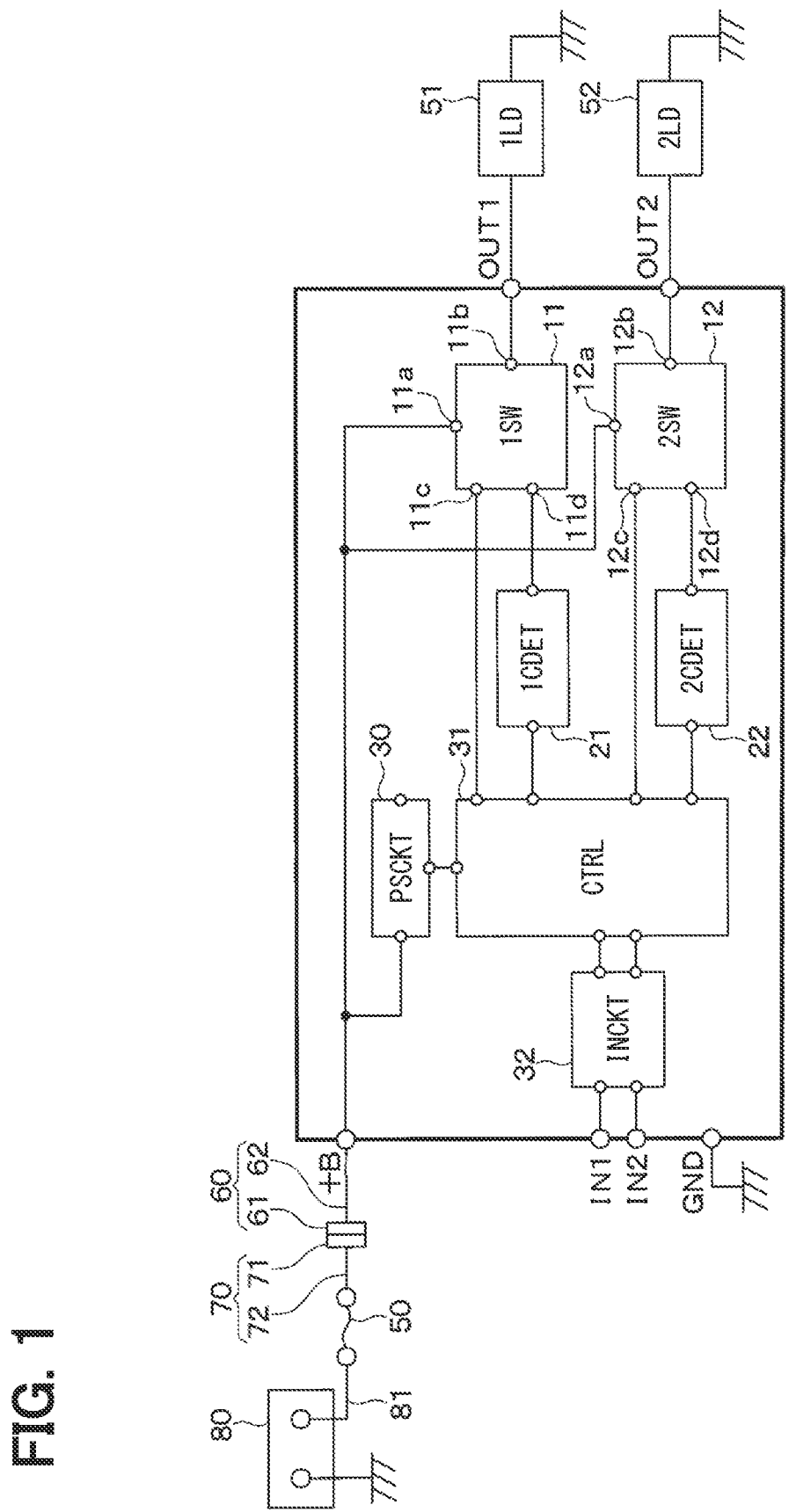
FIG. 1 is a block diagram of a load control device according to a first embodiment.

A load control circuit according to an example includes a channel switching circuit that detects overcurrent and a threshold value switching circuit that sequentially sets multiple threshold values for multiple channels, respectively. Then, the channel for overcurrent detection is selected by the channel switching circuit, and the thresholds for the respective channels is set in order by the threshold switching circuit. A current determination of each of the channels is performed by one comparator, and a current that flows through a load is limited when the result of determination is abnormal.

The above-described load control circuit is designed to detect the overcurrent that flows through the load for each of the channels, but is not provided with a protection function on a power supply terminal side of a power source.

A load drive circuit for driving a load may be provided with a fuse connected between a power source and a power supply terminal of the load drive circuit so as to protect the load drive circuit and an external circuit connected to the power source.

In the load drive circuit provided with the fuse, a load current that flows through a load may vary, for example, when the load is replaced. Then, the fuse may melt due to such variation in the load current.

Therefore, it is necessary to increase a capacity of the fuse and increase a wire diameter of a wire connected to the fuse. However, a cost may increase when the capacity of the fuse is increased or the wire diameter is increased in this way.

A load control device according to an aspect of the present disclosure includes a power supply terminal configured to be connected to a power source via a fuse, a load driver configured to drive multiple loads by electric power supplied from the power source via the fuse and the power supply terminal, a current detector configured to detect multiple load currents that flow through the multiple loads, respectively, and a controller. The controller is configured to calculate a total current that flows through the fuse based on the multiple load currents detected by the current detector, and calculate a physical quantity using the total current in response to that the total current is equal to or higher than a predetermined current value. The physical quantity correlates with the total current and is related to a connecting member that connects between the fuse and the power supply terminal. The controller is further configured to determine whether the physical quantity is equal to or greater than a reference value, and limit at least one of the load currents that flow through the loads in response to that the physical quantity is equal to or greater than the reference value.

According to such a configuration, when the total current is equal to or higher than the predetermined current value, the physical quantity correlating with the total current and related to the connecting member that connects between the fuse and the power supply terminal is calculated using the total current. Then, when the calculated physical quantity is equal to or greater than the reference value, at least one of the load currents that flow through the loads is limited. Therefore, a capacity of the fuse can be reduced, and a wire diameter can be reduced.

Hereinafter, embodiments of the present disclosure will be described with reference to the accompanying drawings. Note that in the following respective embodiments, the same or equivalent parts are indicated by the same reference characters throughout the figures, and thus the description thereof will be omitted.

First Embodiment

A load control device according to a first embodiment will be described with reference to FIGS. 1-4B. The load control device has an overcurrent protection function that prevents an overcurrent from flowing through loads and damaging circuit elements. The load control device may be referred to as a load control circuit.

The load control device includes a first semiconductor switch (1SW) 11, a second semiconductor switch (2SW) 12, a first current detector (1CDET) 21, a second current detector (2CDET2) 22, a power supply circuit (PSCKT) 30, a controller (CTRL) 31, and an input circuit (INCKT) 32.

The load control device further includes a power supply terminal+B, a grounded terminal GND, a first output terminal OUT1 connected to a first load (1LD) 51, and a second output terminal OUT2 connected to a second load (2LD) 52. The first load 51 and the second load 52 are, for example, rear lamps mounted on left and right sides of a rear part of a vehicle.

A positive electrode terminal of a vehicle battery 80 and a fuse 50 are connected via a wire harness 81. The vehicle battery 80 corresponds to a power source. Further, a current path between the fuse 50 and the power supply terminal+B of the load control device are connected via connector-attached wires 60 and 70.

The connector-attached wire 60 includes a connector 61 having a metal terminal and a wire 62 connected to the metal terminal. The wire 62 is connected to the power supply terminal+B of the load control device.

The connector-attached wire 70 includes a connector 71 having a metal terminal and a wire 72 connected to the metal terminal. The wire 72 is connected to the fuse 50. The connector 61 of the connector-attached wire 60 and the connector 71 of the connector-attached wire 70 are fitted to each other, so that the metal terminals of the connector 61 and the connector 71 are connected, and the fuse 50 and the power supply terminal+B of the load control device are electrically connected.

The first semiconductor switch 11 includes a power supply terminal 11a connected to the power supply terminal+B, an output terminal 11b connected to the first load 51, an input terminal 11c to which a control signal from the controller 31 is input, and a sense terminal 11d.

When a control signal instructing to drive the first load 51 is input to the input terminal 11c from the controller 31, the first semiconductor switch 11 applies a load current from the power supply terminal 11a to the first load 51 via the output terminal 11b to drive the first load 51.

The sense terminal 11d of the first semiconductor switch 11 outputs a signal corresponding to the load current that flows through the output terminal 11b. Specifically, the sense terminal 11d outputs a voltage corresponding to the load current that flows through the output terminal 11b.

When a control signal instructing to drive the second load 52 is input to the input terminal 12c from the controller 31, the second semiconductor switch 12 applies a load current from the power supply terminal 12a to the second load 52 via the output terminal 12b to drive the second load 52.

The sense terminal 12d of the second semiconductor switch 12 outputs a signal corresponding to the load current that flows through the output terminal 12b. Specifically, the sense terminal 12d outputs a voltage corresponding to the load current that flows through the output terminal 12b.

The first semiconductor switch 11 and the second semiconductor switch 12 correspond to load drivers that drive the first load 51 and the second load 52 by the electric power supplied from the vehicle battery 80 via the fuse 50 and the power supply terminal+B.

The first current detector 21 outputs a signal indicating the load current that flows through the first load 51 to the controller 31 based on the signal from the sense terminal 11d of the first semiconductor switch 11. Further, the second current detector 22 outputs a signal indicating the load current that flows through the second load 52 to the controller 31 based on the signal from the sense terminal 12d of the second semiconductor switch 12.

The input circuit 32 receives various signals IN1 and IN2 from a switch or the like. The input circuit 32 outputs signals corresponding to the various input signals IN1 and IN2 to the controller 31.

The power supply circuit 30 includes a DC/DC converter that generates a voltage to be supplied to the controller 31. The power supply circuit 30 converts the DC voltage supplied from the power supply terminal+B into a predetermined DC voltage and outputs the DC voltage. The DC voltage supplied from the power supply terminal+B is, for example, about 12 volts, and the predetermined DC voltage is about 3.3 volts.

The controller 31 includes a microcomputer equipped with a central processing unit (CPU), a memory, an input-output unit (I/O), and the like. The controller 31 performs various kinds of processing by executing instructions stored in the memory by the CPU. The processing of the controller 31 includes processing to instruct the first semiconductor switch 11 and the second semiconductor switch 12 to drive the first load 51 and the second load 52, respectively, when a signal instructing the start of operation is input from the switch or the like to the input circuit 32.

Figure 2:
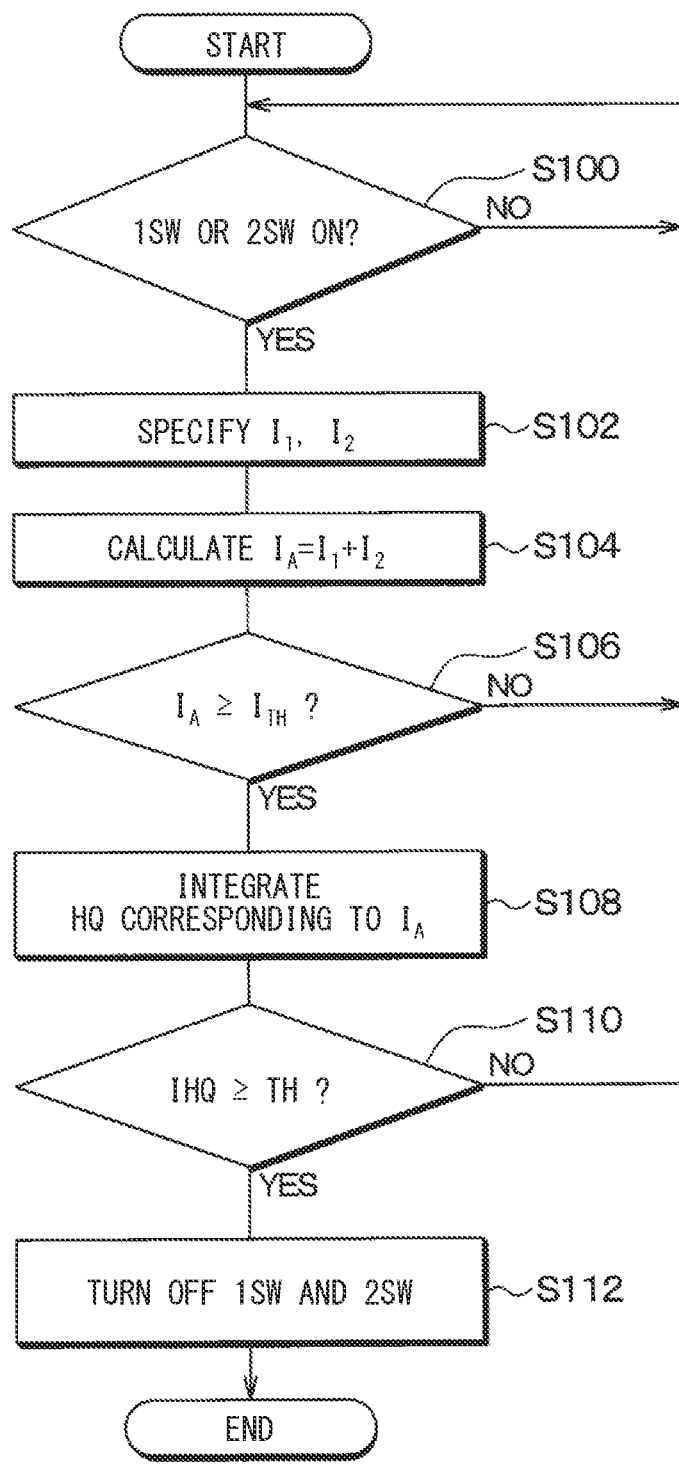
FIG. 2 is a flowchart of a controller of the load control device according to the first embodiment.

Next, the processing of the controller 31 will be described according to the flowchart of FIG. 2. When electric power is supplied from the power supply circuit 30 and the signal instructing the start of operation is input to the input circuit 32 from the switch or the like, the controller 31 turns on the first semiconductor switch 11 and the second semiconductor switch 12 to drive the first load 51 and the second load 52. Further, the controller 31 periodically executes the processing shown in FIG. 2. In the present embodiment, the controller 31 performs the processing shown in FIG. 2 at a cycle of 1 millisecond.

First, the controller 31 determines in S100 whether either the first semiconductor switch (1SW) 11 or the second semiconductor switch (2SW) 12 is turned on. When both the first semiconductor switch 11 and the second semiconductor switch 12 are off, the controller 31 repeatedly executes the determination in S100.

When either the first semiconductor switch 11 or the second semiconductor switch 12 is turned on, the controller 31 specifies the load current $I_1$ of the first load 51 and the load current $I_2$ of the second load 52 in S102. Specifically, the controller 31 specifies the load current $I_1$ of the first load 51 based on the signal from the first current detector 21, and specifies the load current $I_2$ of the second load 52 based on the signal from the second current detector 22.

Next, in S104, the controller 31 calculates a total current $I_A$ that flows through the fuse 50. The total current $I_A$ can be obtained by adding the load current $I_1$ and the load current $I_2$.

Next, the controller 31 determines in S106 whether the total current $I_A$ is equal to or higher than a predetermined current value $I_{TH}$.

When the total current $I_A$ is less than the predetermined current value, the determination in S106 becomes NO, and the processing returns to S100.

When the total current $I_A$ is equal to or higher than the predetermined current value $I_{TH}$, the controller 31 calculates a physical quantity using the total current $I_A$ in S108. The physical quantity correlates with the total current $I_A$ and is related to the connector-attached wires 60 and 70 that connect between the fuse 50 and the power supply terminal+B.

In the present embodiment, the controller 31 periodically calculates, using the total current $I_A$, heat quantities (HQ) of the connector-attached wires 60 and 70 as the physical quantity correlating with the total current $I_A$, and integrates the heat quantities of the connector-attached wires 60 and 70. The controller 31 of the present embodiment integrates the heat quantities of the connector-attached wires 60 and 70 every 1 millisecond. The heat quantities of the connector-attached wires 60 and 70 can be obtained by multiplying the resistance values of the connector-attached wires 60 and 70 with by a predetermined coefficient and the total current $I_A$.

Next, the controller 31 determines in S110 whether the integrated heat quantity (IHQ) is equal to or greater than a predetermined value TH. Specifically, it is determined whether or not the heat quantity integrated in a predetermined period is equal to or greater than the predetermined value TH. When the integrated heat quantity is less than the predetermined value TH, the determination in S110 is NO, and the processing returns to S100.

Further, when the integrated heat quantity is equal to or greater than the predetermined value due to, for example, the variation in the load current of the first load 51 or the second load 52, the controller 31 turns off the first semiconductor switch 11 and the second semiconductor switch 12 in S112. As a result, the load current $I_1$ and the load current $I_2$ are rapidly reduced, and the total current $I_A$ is also rapidly reduced. Therefore, the fuse 50 is prevented from melting.

Next, an off control of the first semiconductor switch 11 and the second semiconductor switch 12 will be described with reference to FIGS. 3A and 3B.

Figure 3A:
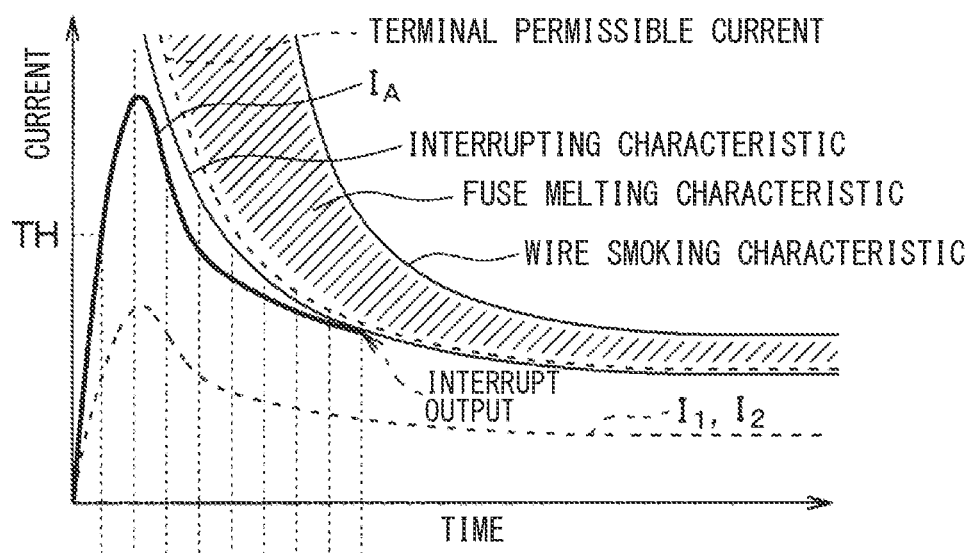
FIG. 3A is a diagram showing relationships among an interrupting characteristic, a terminal permissible current, a fuse melting characteristic, a wire smoking characteristic, and a total current.
Figure 3B:
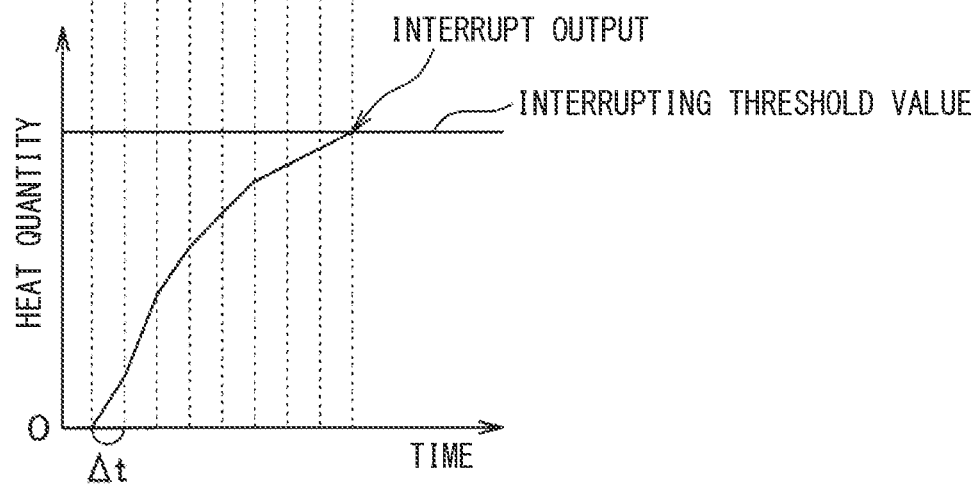
FIG. 3B is a diagram showing a relationship between an integrated heat quantity and an interrupting threshold value.

FIG. 3A shows the relationship between an interruption characteristic, a terminal permissible current, a fuse melting characteristic, a wire smoking characteristic, the total current $I_A$, and the load currents $I_1$ and $I_2$. FIG. 3B shows the relationship between the integrated heat quantity and an interrupting threshold value. The vertical axis and the horizontal axis of FIG. 3A are current and time, respectively. The vertical axis and the horizontal axis of FIG. 3B are heat quantity and time, respectively.

The terminal permissible current is a permissible current of each terminal of the connector-attached wires 60 and 70. Since the melting characteristic of the fuse 50 varies, the fuse melting characteristic is defined by the shaded area as shown in FIG. 3A. Further, in FIG. 3A, the interrupting characteristic is defined as a current value smaller than the fuse melting characteristic and the wire smoking characteristic at the same time.

When the total current $I_A$ shown in FIG. 3A is equal to or higher than the interrupting characteristic, in S108, the controller 31 of the present embodiment periodically calculates the heat quantities of the connector-attached wires 60 and 70 using the total current $I_A$ and integrates the heat quantities. Then, in S110, when the integrated heat quantity is equal to or greater than the predetermined value, the fuse 50 may melt or the temperatures of the connector-attached wires 60 and 70 may increase and the connector-attached wires 60 and 70 may be deformed. Therefore, in S112, the first semiconductor switch 11 and the second semiconductor switch 12 are turned off.

Specifically, when the total current $I_A$ becomes equal to or higher than the predetermined current value $I_{TH}$, the controller 31 integrates the heat quantities of the connector-attached wires 60 and 70 each predetermined cycle (1 millisecond in the present embodiment) that is indicated by Δt in FIG. 3. Then, when the heat quantity integrated in the predetermined period becomes equal to or greater than the interrupting threshold value, the controller 31 turns off the first semiconductor switch 11 and the second semiconductor switch 12. As a result, the load currents that flow through the first load 51 and the second load 52 are interrupted, and the output is interrupted.

Next, a usable current region of a load control device according to a comparative example and a usable current region of the load control device according to the present embodiment will be described with reference to FIGS. 4A and 4B. The load control device according to the comparative example does not perform the off control of the first semiconductor switch 11 and the second semiconductor switch 12 using the interrupting characteristic as in the load control device according to the present embodiment.

Figure 4A:
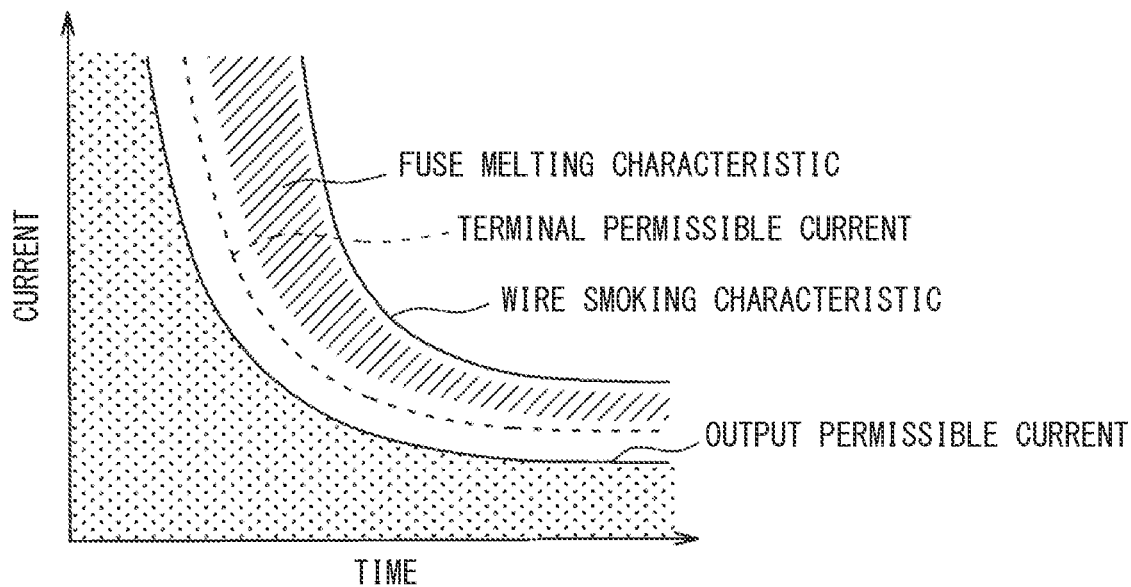
FIG. 4A is a diagram showing relationships among a fuse melting characteristic, a terminal permissible current, and a wire smoking characteristic according to a comparative example.

The usable current region of the load control device according to the comparative example is shown by point hatching in FIG. 4A. The usable current region of the load control device according to the present embodiment is shown by point hatching in FIG. 4B. Note that FIGS. 4A and 4B also show interrupting characteristics, fuse melting characteristics, terminal permissible currents, and wire smoking characteristics.

Figure 4B:
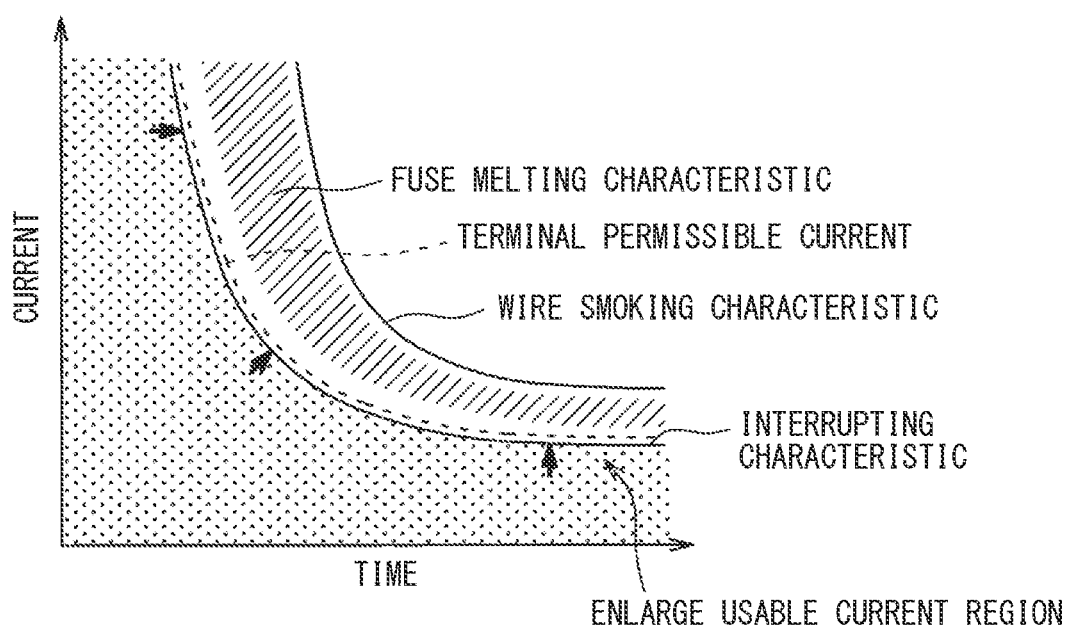
FIG. 4B is a diagram showing relationships among a fuse melting characteristic, a terminal permissible current, and a wire smoking characteristic according to the first embodiment.

As can be seen by comparing FIGS. 4A and 4B, the usable current region of the load control device according to the present embodiment is larger than the usable current region of the load control device according to the comparative example. That is, the load control device according to the present embodiment has a wider range in which the total current $I_A$ is permitted to be taken than in the load control device according to the comparative example.

That is, in the comparative example, the usable current region of the total current $I_A$ is relatively narrow, and the loads are likely to be interrupted due to variations in the load currents that flow through the loads.

On the other hand, in the load control device according to the present embodiment, the usable current region of the total current $I_A$ is wider than that of the comparative example, and the loads are less likely to be interrupted because the first semiconductor switch 11 and the second semiconductor switch 12 are not easily turned off.

Further, even if a capacity of the fuse 50 is reduced and a wire diameter is reduced, it is possible to restrict the fuse 50 from easily melting or the connector-attached wires 60 and 70 from being easily deformed due to a temperature rise.

The load control device according to the above-described embodiment includes the power supply terminal+B connected to the vehicle battery 80 via the fuse 50. The load control device further includes the first and second semiconductor switches 11 and 12 configured to drive the loads 51 and 52 by electric power supplied from the vehicle battery 80 via the fuse 50 and the power supply terminal+B. The load control device further includes the first and second current detectors 21 and 22 configured to detect the load currents that flow through the loads 51 and 52, and a controller configured to calculate the total current that flows through the fuse 50 based on the load currents detected by the first and second current detectors 21 and 22. The controller is further configured to calculate, using the total current, the physical quantity correlating with the total current and related to a connecting member (e.g., the connector-attached wires 60, 70) that connects between the fuse 50 and the power terminal in response to that the total current is equal to or higher than a predetermined current value. The controller is further configured to determine whether the calculated physical quantity is equal to or greater than the reference value and limit at least one of the load currents that flow through the loads 51 and 52 when the physical quantity is equal to or greater than the reference value.

According to such a configuration, when the total current exceeds the predetermined current value, the controller calculates, using the total current, the physical quantity correlating with the total current and related to the connector-attached wires 60 and 70 as the connecting member that connects between the fuse 50 and the power terminal+B. When the calculated physical quantity exceeds the reference value, at least one of the load currents that flow through the loads 51 and 52 is limited, so that the capacity of the fuse 50 can be reduced and the wire diameter can be reduced.

In the above-described embodiment, the controller periodically calculates the heat quantity of the connecting member as the physical quantity, and determines whether the integrated heat quantity of the connecting member is equal to or higher than the reference value.

In this way, at least one of the load currents that flow through the loads can be limited by periodically calculating the heat quantity of the connecting member and determining whether the integrated value of the heat quantity of the connecting member exceeds the reference value.

Other Embodiments

The load control device according to the first embodiment is configured so that the voltages corresponding to the load currents that flow through the first and second loads 51 and 52 are output from the sense terminals 11d and 12d of the first and second semiconductor switches 11 and 12. A load control device according to another embodiment may be configured so that currents corresponding to the load currents that flow through the first and second loads 51 and 52 are output from the sense terminals 11d and 12d of the first and second semiconductor switches 11 and 12.

The load control device according to the first embodiment is configured to calculate the heat quantities of the connector-attached wires 60 and 70 based on the total current $I_A$. A load control device according to another embodiment may be configured to calculate a heat quantity of the fuse 50 using the total current $I_A$.

The load control device according to the first embodiment is configured to calculate the heat quantities of the connector-attached wires 60, 70 as the physical quantities correlating with the total current $I_A$ and related to the connector-attached wires 60 and 70. A load control device according to another embodiment may be configured to calculate temperatures of the connector-attached wires 60 and 70 as the physical quantities correlating with the total current $I_A$ and related to the connector-attached wires 60 and 70.

The load control device according to the first embodiment is configured to turn off the first semiconductor switch 11 and the second semiconductor switch 12 in S112. A load control device according to another embodiment may be configured to turn off the first semiconductor switch 11 or the second semiconductor switch 12. A load control device according to another embodiment may be configured to limit at least one of the load currents that flow through the first semiconductor switch 11 and the second semiconductor switch 12. A load control device according to another embodiment may be configured to prioritize the first semiconductor switch 11 and the second semiconductor switch 12 and turn off the first semiconductor switch 11 or the second semiconductor switch 12 with a lower priority.

In the first embodiment, the connected-attached wires 60 and 70 have been described as examples of the connecting member. However, the connecting member is not limited to the wires to which the connectors are attached such as the connector-attached wires 60 and 70, and the connecting member may be a simple wire.

The present disclosure is not limited to the above-described embodiments, and can be appropriately modified within the scope described in the claims. The above-described embodiments are not independent of each other, and can be appropriately combined except when the combination is obviously impossible. In each of the above-described embodiments, individual elements or features of a particular embodiment are not necessarily essential unless it is specifically stated that the elements or the features are essential, or unless the elements or the features are obviously essential in principle. Further, in each of the above-described embodiments, when numerical values such as the number, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

What is claimed is:

1. A load control device comprising:
   a power supply terminal configured to be connected to a power source via a fuse;
   a load driver configured to drive a plurality of loads by electric power supplied from the power source via the fuse and the power supply terminal;
   a current detector configured to detect a plurality of load currents that flows through the plurality of loads, respectively; and
   a controller configured to:
      calculate a total current that flows through the fuse based on the plurality of load currents detected by the current detector;
      calculate a physical quantity using the total current in response to that the total current is equal to or higher than a predetermined current value, the physical quantity correlating with the total current and related to a connecting member that connects between the fuse and the power supply terminal;
      determine whether the physical quantity is equal to or greater than a reference value; and
      limit at least one of the plurality of load currents that flows through the plurality of loads in response to that the physical quantity is equal to or greater than the reference value.

2. The load control device according to claim 1, wherein the controller is further configured to:
- periodically calculate a heat quantity of the connecting member as the physical quantity; and
- determine whether an integrated value of the heat quantity of the connecting member is equal to or greater than a predetermined value.

3. The load control device according to claim 1, wherein the controller includes a processor and a memory, the memory stores instructions configured to, when executed by the processor, cause the processor to:
- calculate the total current that flows through the fuse based on the plurality of load currents detected by the current detector;
- calculate the physical quantity using the total current in response to that the total current is equal to or higher than the predetermined current value;
- determine whether the physical quantity is equal to or greater than the reference value; and
- limit at least one of the plurality of load currents that flows through the plurality of loads in response to that the physical quantity is equal to or greater than the reference value.

* * * * *